3,830,885
DIALKYL N,N-DIALKOXYMETHYL-CARBAMYLPHOSPHONATES

Harro Petersen, Frankenthal, Germany, assignor to Badische Anilin- & Soda-Fabrik Aktiengesellschaft, Ludwigshafen, Germany
No Drawing. Filed Sept. 24, 1969, Ser. No. 860,833
Int. Cl. C07d 105/04; C07f 9/40
U.S. Cl. 260—943                                3 Claims

ABSTRACT OF THE DISCLOSURE

Production of dialkyl N,N - dialkoxymethylcarbamylphosphonates by reaction of dialkyl carbamylphosphonates or their N-methylol or N-alkoxymethyl compounds with formaldehyde followed by treatment of the reaction mixture with alkanols, and the new dialkyl N,N-dialkoxymethylcarbamylphosphonates themselves. The new compounds are assistants, particularly flameproofing additives, for surface coatings and plastics and valuable starting materials for the production of such assistants.

---

The invention relates to a process for the production of dialkyl N,N'-dialkoxymethylcarbamylphosphonates by reaction of dialkyl carbamylphosphonates or their N-methylol or N-alkoxymethyl compounds with formaldehyde followed by treatment of the reaction mixture with alkanols, and new substances of this type.

It is known that primary carboxylic amides can be converted into N-monomethylol compounds by reaction with formaldehyde in alkaline solution (Liebigs Annalen der Chemie, 343, 207 (1905); 361, 113 (1908)). In alkaline solution the methylolamides are converted into bis-acylamidomethyl ethers (Kunststoffe, 41, 221 (1951)). The reaction of N-monomethylamides with a second molecule of formaldehyde to definite N,N-dimethylolamides does not take place (Kunststoffe, 41, 221 (1951)). Methylolation of amides also takes place in the presence of acids, the methylol compounds readily being converted into methylene-bis-acylamides (Liebigs Annalen der Chemie, 343, 207 (1905); 361, 113 (1908)). Conversion of the amides with formaldehyde in the presence of acids into dimethylol compounds could not be achieved.

An object of this invention is a new process for the production of a large number of dialkyl N,N-dialkoxymethylcarbamylphosphonates in good yields.

Another object of this invention is the new dialkyl N,N-dialkoxymethylcarbamylphosphonates.

These and other objects are achieved and dialkyl N,N-dialkoxymethylcarbamylphosphonates having the general formula (I):

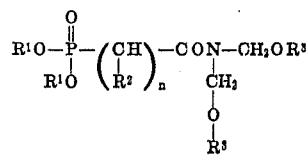

wherein the individual radicals $R^1$ and $R^3$ may be identical or different and each denotes an aliphatic radical, moreover the two radicals $R^1$ may denote, together with the adjacent oxygen atoms and the phosphorus atom, a five-membered or six-membered heterocyclic ring, $R^2$ denotes a hydrogen atom, an aliphatic radical, a hydroxyl group or a halogen atom and $n$ denotes zero, 1, 2 or 3 are obtained by reacting a dialkyl carbamylphosphonate having the general formula (II):

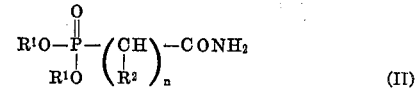

or a dialkyl N-methylolcarbamylphosphonate having the general formula (III):

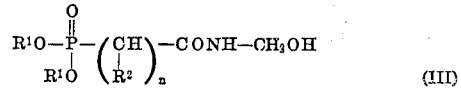

or a dialkyl N-alkoxymethylcarbamylphosphonate having the general formula (IV):

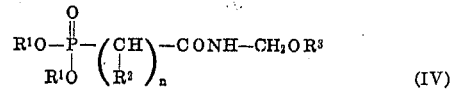

where the individual radicals $R^1$, $R^2$, $R^3$ and $n$ have the meanings given above in a first stage with formaldehyde in at least an equivalent amount with reference to the replaceable hydrogen atoms in the amide groups of the starting materials (II), (III) or (IV) in the presence of a base and treating the reaction mixture with an alkanol having the general formula (V):

$$R^3OH \qquad (V)$$

where $R^3$ has the meanings given above in the presence of an acid in a second stage.

When dimethyl 2 - carbamylethanephosphonate and methanol are used, the reactions may be represented by the following equations:

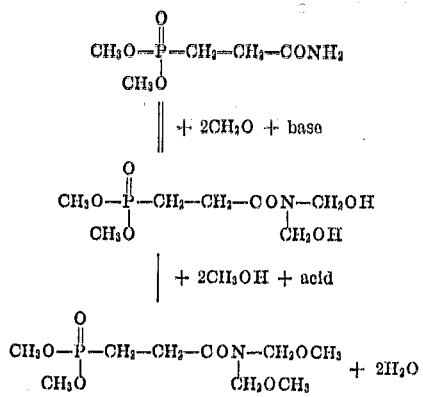

Having regard to the state of the art, the process according to the invention surprisingly gives a large number of dialkyl N,N-dialkoxymethylcarbamylphosphonates in good yields. In particular it could not have been expected that N,N-dialkoxymethyl compounds would form at all in any significant amount and would not be decomposed again into their starting materials and under the acid conditions chosen no hydrolysis of the phosphonates would take place.

Dialkyl carbamylphosphonates and their monomethylol or monoalkoxymethyl compounds having the general formulae (II), (III) and (IV) are used as starting materials. Starting materials (III) may be obtained by reacting starting materials (II) with formaldehyde. Starting materials (IV) may be obtained from starting materials (III) for example by reaction with alkanols in acid medium. Preferred starting materials (II), (III), and (IV) (and accordingly preferred end products (I)) are those in whose formulae the individual radicals $R^1$ and $R^3$ are identical or different and each denotes an alkyl radical having one to six carbon atoms, preferably one to three carbon atoms, or an alkenyl radical having three to six carbon atoms, moreover the two radicals $R^1$ together with the two adjacent oxygen atoms and the phosphorus atom may denote a five-membered or six-membered heterocyclic ring, $R^2$ denotes a hydrogen atom, an alkyl radical having one to five carbon atoms, a hydroxyl group, or a chlorine or bromine atom and $n$ denotes zero, 1 or 2. In each case the said radicals may be linear or branched and may bear one or more atoms and/or groups which are inert under the reaction conditions, for example halogen atoms, preferably chlorine or bromine atoms, hydroxyl groups, or alkoxy groups having one to three carbon atoms, as substituents. When $n$ denotes 2 or 3, the individual radical $R^2$ may be identical or different.

For example the following starting materials (II), (III) or (IV) may be used in the reaction:

dimethyl 2-carbamylethanephosphonate,
diethyl 2-carbamylethanephosphonate,
dimethyl 2-carbamylpropanephosphonate,
dimethyl 2-carbamyl-1-chloroethanephosphonate,
diisopropyl carbamylmethanephosphonate,
diethyl carbamylphosphonate,
dihexyl carbamylphosphonate,
diallyl carbamylphosphonate,
dibutyl 2-carbamyl-1-hydroxypropanephosphonate; and
corresponding N-monomethylol, N-monomethoxymethyl and N-monoethoxymethyl compounds.

The starting materials (II), (III) and (IV) are reacted with at least an equivalent amount of formaldehyde, with reference to the replaceable hydrogen atoms in the amid group of the starting material (II), (III) or (IV), in the first stage of the process. Generally from 2 to 5 moles of formaldehyde is used in the case of dialkyl carbamylphosphonates having the general formula (II) and in the case of N-monomethylol compounds (III) and N-monoalkoxymethyl compounds (IV) from 1 to 4 moles of formaldedehyde is used per mole of starting material. Formaldehyde may be supplied to the reaction as an aqueous solution or in the form of paraformaldehyde.

The first stage of the process is carried out in the presence of a base, preferably an alkali metal hydroxide or an alkaline earth metal hydroxide, for example sodium hydroxide, calcium hydroxide; alkali metal carbonates, for example sodium carbonate; tertiary amines, for example triethylamine, dimethylethanolamine, or pyridine. The base is generally used in an amount of from 0.5 to 10% by weight with reference to the starting material (II), (III) or (IV). The reaction takes place as a rule in the presence of a solvent which is inert under the reaction conditions such as water; aromatic hydrocarbons, for example benzene or toluene; ethers, for example dioxane or tetrahydrofuran; or mixtures of these. It is advantageous to carry out the reaction in highly concentrated solutions, for example from 70 to 98% by weight, particularly from 80 to 95% by weight, solutions of the starting material (II), (III) or (IV) in the said solvents.

The result of the first stage of the process is a reaction mixture which in the case of starting material (II) contains the corresponding N-monomethylol compound, formaldehyde and the corresponding N,N-dimethylol compound. The reaction mixture in the case of starting material (III) has a similar composition while in the case of starting material (IV) the corresponding N-methylol-N-alkoxymethyl derivative is present as well as the N-alkoxymethyl compound and formaldehyde.

The reaction mixture formed in the first stage is then reacted in a second stage with an alkanol having the general formula (V) in the presence of an acid. Preferred alkanols (V) (and consequently preferred end products (I)) are those in whose formula $R^3$ has the preferred meanings given above, for example methanol, ethanol or isopropanol. The alkanol (V) is used as a rule in at least the stoichiometric amount with reference to starting material (II), (III) or (IV), or preferably in an excess of twice to ten times. When a starting material (IV) is used, the reaction mixture is advantageously reacted in the second stage of the process with an amount of the alkanol (V) equivalent to the alkoxymethyl group of the starting material (IV).

The acid required for the second stage of the process may be an inorganic acid, for example sulfuric acid, hydrochloric acid or phosphoric acid, or an organic acid, for example oxalic acid, phthalic acid, benzenesulfonic acid or p-toluenesulfonic acid. Generally it is used in an amount of 1 to 10% by weight with reference to the amount of starting material (II), (III) or (IV) on which the reaction mixture is based in addition to the amount of acid required to neutralize the alkaline mixture (first stage). The alkanol (V) and all or part of any solvent used in the first stage generally serve as the solvent for the second stage. Further amounts of these solvents may be added if desired.

Both the first and second stages of the process are carried out as a rule at a temperature of from 0° to 100° C., preferably at from 20° to 60° C., at atmospheric or superatmospheric pressure, continuously or intermittently.

The two stages of the process may be carried out as follows:

A mixture of starting material (II), (III) or (IV), formaldehyde, base and if desired solvent is kept for from two to five hours at the reaction temperature. The mixture may then be neutralized with acid and/or concentrated. Alkanol (V) and acid are then added and the resultant mixture is kept at the reaction temperature for from one hour to three hours while mixing well. The mixture is then neutralized and the end product is separated by a conventional method, for example by fractional distillation or crystallization.

The new compounds which can be prepared by the process according to the invention are assistants, particularly flameproofing additives, for surface coatings and plastics and are valuable starting materials for the production of such assistants. For example a flame resistant coating may be achieved in metals by brushing the metal part with a mixture of 90 parts of a conventional aminoplast resin, for example a melamin-formaldehyde-butanol condensation product, and 10 parts of a dialkyl N,N-dialkoxymethylcarbamylphosphonate with an addition of a hardening agent and baking the coating for some minutes at from 150° to 280° C.

The following Examples illustrate the invention.
Parts given in the Examples are by weight.

EXAMPLE 1

A mixture of 724 parts of dimethyl 2-carbamylethanephosphonate, 240 parts of paraformaldehyde and 80 parts of 25% by weight caustic soda solution is heated for two hours while stirring at 50° C. in an apparatus fitted with a stirrer. The reaction mixture is then concentrated to a weight of 990 parts under subatmospheric pressure. The syrupy residue has added to it 2,500 parts of methanol and 100 parts of concentrated hydrochloric acid and the whole is heated at 45° to 50° C. while stirring. The mixture is then neutralized with caustic soda solution, the deposited sodium chloride is filtered off and the excess methanol and the water of reaction formed are distilled off at subatmospheric pressure. 979 parts (91% of the theory) of dimethyl N,N - dimethoxymethylcarbamylethanephosphonate is obtained as a liquid crude product. The boiling point (with decomposition) is 112° to 122° C. at 0.1 mm.
Analytical data: C₉H₂₀O₆NP (269):

| Analysis (percent) | | | | | | | | | | | | | |
|---|---|---|---|---|---|---|---|---|---|---|---|---|---|
| Calculated | | | | | | | Found | | | | | | |
| C | H | O | N | P | CH₂O | OCH₃ | C | H | O | N | P | CH₂O | OCH₃ |
| 40.2 | 7.44 | 35.7 | 5.2 | 11.52 | 22.3 | | 46.1 | 39.8 | 7.4 | 36.0 | 5.3 | 11.6 | 21.8 | 45.4 |

EXAMPLE 2

A mixture of 179 parts of 2-oxo-2-(β-carbamylethyl)-1,3,2-dioxaphospholane, 60 parts of paraformaldehyde and 20 parts of 25% aqueous caustic soda solution is heated in a stirred apparatus for three hours at from 45° to 50° C. while stirring. Then the reaction mixture is added to a mixture of 600 parts of methanol and 35 parts of concentrated hydrochloric acid and heated for two hours while stirring at 45° C. The reaction mixture is neutralized with concentrated caustic soda solution. The deposited sodium chloride is filtered off. The excess methanol and the water of reaction are evaporated at subatmospheric pressure. 260 parts of 2-oxo-2-(N,N-dimethoxymethyl-β-carbamylethyl) - 1,3,2 - dioxapholane is obtained as crude liquid product. This is equivalent to a yield of 97.5% of the theory. The product cannot be distilled in a high vacuum because decomposition begins at about 125° C.

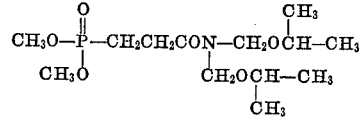

EXAMPLE 3

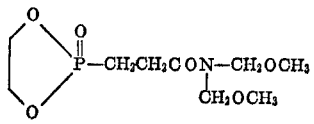

A mixture of 69.6 parts of di-β-tribromoethyl 2-carbamylpropane - 1-phosphonate, 6 parts of paraformaldehyde and 10 parts of a 25% by weight aqueous caustic soda solution is heated in a stirred apparatus for three hours at 50° C. with agitation. Then 400 parts of ethanol containing 20 parts of hydrogen chloride is added to the reaction solution, and the whole is heated for three hours at from 35° to 40° C. The reaction mixture is neutralized with caustic soda solution, the deposited sodium chloride is filtered off and the filtrate is evaporated at 50° C. in a water jet vacuum. After having stood for two days, at 0° C., the end product is deposited in crystalline form. It is filtered off, dried and recrystallized from ethanol. 21 parts of di - β-tribromoethyl N,N-diethoxymethyl-2-carbamylpropane-1-phosphonate is obtained. This is a yield of 26% of the theory.

EXAMPLE 4

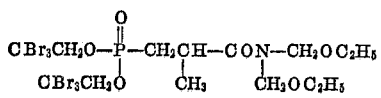

197 parts of dimethyl 2-carbamyl-2-hydroxyethane-1-phosphonate, 60 parts of paraformaldehyde and 20 parts of a 25% aqueous sodium hydroxide solution are heated at 50° C. for two hours while stirring. 500 parts of methanol containing 30 parts of concentrated hydrochloric acid is added to the reaction mixture while stirring. The whole is heated for another two hours at 50° C., cooled to room temperature and neutralized with concentrated caustic soda solution. Deposited sodium chloride is filtered off and the methanol filtrate is concentrated under subatmospheric pressure. 260 parts (91% of the theory) of dimethyl N, N-dimethoxymethyl - 2-carbamyl-2-hydroxyethane-1-phosphonate is obtained. The product cannot be distilled in a high vacuum because it decomposes. C₉H₂₀O₇NP (285):

| Analysis (percent) | | | | | | | | | | | | |
|---|---|---|---|---|---|---|---|---|---|---|---|
| Calculated | | | | | | Found | | | | | | |
| C | H | N | P | CH₂O | CH₃O | C | H | N | P | CH₂O | CH₃O |
| 37.9 | 7.0 | 4.9 | 10.9 | 21.1 | 43.5 | 37.7 | 7.2 | 4.6 | 10.3 | 20.8 | 42.6 |

EXAMPLE 5

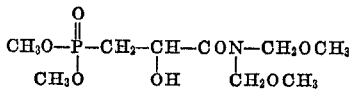

A mixture of 724 parts of dimethyl 2-carbamylethane-1-phosphonate, 240 parts of paraformaldehyde and 80 parts of 25% by weight aqueous caustic soda solution is heated while stirring at 50° C. for two hours in a stirred apparatus. The reaction mixture is then concentrated to a weight of 990 parts at subatmospheric pressure and 50° to 60° C. 2,500 parts of isopropanol which contains 40 parts of hydrogen chloride is added to the syrupy residue which is then heated for two hours at from 45° to 50° C. The reaction mixture is then neutralized with caustic soda solution, the deposited sodium chloride is filtered off and the filtrate is evaporated under subatmospheric pressure at a bath temperature of from 60° to 70° C. 1,080 parts (83% of the theory) of dimethyl N,N-diisopropoxymethyl-2-carbamylethane-1-phosphonate is obtained. The product cannot be distilled in a high vacuum because it decomposes from 130° C.

I claim:
1. A dialkyl N,N-dialkoxymethylcarbamylphosphonate having the formula (I):

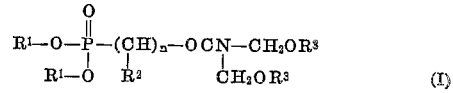

where the individual radicals R¹ and R³ may be identical or different and each denotes an unsubstituted alkyl radical having one to six carbon atoms or an alkyl radical having one to six carbon atoms which bears one or more halogen atoms, hydroxyl groups and/or alkoxy groups having one to three carbon atoms as substituents or an alkylene radical having three to six carbon atoms, and moreover the two radicals R¹ together with the adjacent oxygen atoms and the phosphorus atom may denote a five-membered or six-membered heterocyclic ring, R² denotes a hydrogen atom, an alkyl radical having one to five carbon atoms, a hydroxyl group, a chlorine atom or a bromine atom, and n denotes zero, 1, 2 or 3.

2. A compound as in claim 1 wherein the individual radicals R¹ and R³ may be identical or different and each denotes an unsubstituted alkyl radical having one to six carbon atoms and R² denotes hydrogen and n denotes 1, 2.

3. A compound as in claim 1 wherein the individual radicals R¹ and R³ denote methyl, R² denotes hydrogen, and n denotes 2.

References Cited

UNITED STATES PATENTS

| 3,265,773 | 8/1966 | Losco et al. | 260—943 |
| 3,381,062 | 4/1968 | Zahir | 260—937 X |
| 3,639,539 | 2/1972 | Nachbur et al. | 260—943 X |

ANTON H. SUTTO, Primary Examiner

U.S. Cl. X.R.

106—15 FP; 260—937, 968

UNITED STATES PATENT AND TRADEMARK OFFICE
CERTIFICATE OF CORRECTION

PATENT NO. : 3,830,885
DATED : August 20, 1974
INVENTOR(S) : Harro Petersen

It is certified that error appears in the above-identified patent and that said Letters Patent are hereby corrected as shown below:

In the heading, insert --Claims priority, Application German, September 27, 1968, P 17 93 514.7--.

Signed and Sealed this seventh Day of October 1975

[SEAL]

Attest:

RUTH C. MASON
Attesting Officer

C. MARSHALL DANN
Commissioner of Patents and Trademarks